US010269001B2

(12) United States Patent
Rose et al.

(10) Patent No.: US 10,269,001 B2
(45) **Date of Patent: *Apr. 23, 2019**

(54) SYSTEM AND METHOD FOR POINT OF SALE TRANSACTIONS

(71) Applicant: Target Brands, Inc., Minneapolis, MN (US)

(72) Inventors: Greg Rose, Victoria, MN (US); Mike Cooley, Mound View, MN (US); John Deters, Eagan, MN (US); Kevin Jansen, Maple Grove, MN (US); Joseph Brenny, Minneapolis, MN (US); Julie Wegmiller, Edina, MN (US)

(73) Assignee: Target Brands, Inc., Minneapolis, MN (US)

( * ) Notice: Subject to any disclaimer, the term of this patent is extended or adjusted under 35 U.S.C. 154(b) by 419 days.

This patent is subject to a terminal disclaimer.

(21) Appl. No.: 14/994,111

(22) Filed: Jan. 12, 2016

(65) Prior Publication Data

US 2016/0125379 A1 May 5, 2016

Related U.S. Application Data

(63) Continuation of application No. 13/016,263, filed on Jan. 28, 2011, now Pat. No. 9,659,286.

(51) Int. Cl.

| | |
|---|---|
| ***G06Q 20/20*** | (2012.01) |
| ***G07G 1/00*** | (2006.01) |
| ***G06Q 10/08*** | (2012.01) |
| ***G06Q 30/02*** | (2012.01) |
| ***G06Q 30/06*** | (2012.01) |
| ***G06F 3/02*** | (2006.01) |
| ***G06F 3/0481*** | (2013.01) |
| ***G06F 3/0484*** | (2013.01) |

(52) U.S. Cl.

CPC ............. *G06Q 20/204* (2013.01); *G06F 3/02* (2013.01); *G06F 3/0481* (2013.01); *G06F 3/0484* (2013.01); *G06Q 10/087* (2013.01); *G06Q 20/202* (2013.01); *G06Q 20/208* (2013.01); *G06Q 20/209* (2013.01); *G06Q 30/02* (2013.01); *G06Q 30/06* (2013.01); *G07G 1/0045* (2013.01)

(58) Field of Classification Search

None

See application file for complete search history.

(56) References Cited

U.S. PATENT DOCUMENTS

| | | | | |
|---|---|---|---|---|
| 5,969,704 A * | 10/1999 | Green | G06Q 30/02 | 345/474 |
| 2011/0218870 A1 * | 9/2011 | Shams | G06Q 20/204 | 705/17 |

FOREIGN PATENT DOCUMENTS

| | | | |
|---|---|---|---|
| DE | 29604996 U1 * | 9/1996 | A47F 9/046 |

* cited by examiner

*Primary Examiner* — Scott A Zare

(74) *Attorney, Agent, or Firm* — Merek, Blackmon & Voorhees, LLC

(57) ABSTRACT

Disclosed herein are methods and systems for executing a first transaction at a checkout system at substantially the same time that a second transaction is started at the checkout system. For example, a cashier can scan one or more items, adding the items to a first transaction. When all items have been added to the first transaction and a first customer is making a payment in the first transaction, the cashier can begin to add items to a second transaction, such that execution of the first transaction occurs at substantially the same time that items are added to the second transaction.

19 Claims, 7 Drawing Sheets

SYSTEM AND METHOD FOR POINT OF SALE TRANSACTIONS

The subject patent application is a continuation of U.S. patent application Ser. No. 13/016,263 filed on Jan. 28, 2011 from which priority is claimed under 35 USC § 120. The entire content of U.S. patent application Ser. No. 13/016,263 is incorporated herein by reference.

BACKGROUND

Consumers purchase products in retail stores and online over the Internet. Shopping at a retail store sometimes allows consumers the ability to use interactive displays of products or use products before the consumer completes a purchase. Shopping online allows consumers to interact with pictures, videos, and/or audio clips relating to the products the consumer is considering for purchase. Retail store employees often provide help in selecting what type of product a consumer is looking for or what features the product should have.

Point of sale (POS) systems allow consumers to purchase products from retail stores. Store employees sell products to consumers by ringing up a sales transaction; either after assisting the consumer in locating a product or after the consumer locates a product without assistance. Point of sale systems scan universal product codes (UPC) in order to determine the price of products and add the product and associated price to the sales transaction. After all products have been added to a transaction, the point of sale system adds sales tax for the appropriate products. Consumers pay for products and sales tax at a point of sale system using cash, checks, or credit cards.

Inventory tracking systems allow retail businesses to keep track of inventory and determine when additional products need to be ordered. Some electronic inventory tracking systems communicate with point of sale systems and warehouses to keep track of the product inventory at retail stores. When stock levels of products fall below a predetermined level, additional stock can be requested from a warehouse. Electronic inventory tracking systems track sales and returns of products over time. Sales and return data is analyzed to determine trends, such as sales volume during different times of the year. Inventory systems can update stock levels throughout the year in order to adjust for changes in sales volume. Sometimes employees of a retail store manually scan all products of the retail store in order to verify the actual stock levels of products and to update product stock information in the inventory tracking system.

SUMMARY

Disclosed herein are methods and systems for executing a first transaction at a checkout system at substantially the same time that a second transaction is started at the checkout system. For example, a cashier can scan one or more items, adding the items to a first transaction. When all items have been added to the first transaction and a first customer is providing payment for goods and/or services in the first transaction, the cashier can begin to add items to a second transaction, such that execution of the first transaction occurs at substantially the same time that items are added to the second transaction.

In some implementations, the checkout system includes a full point of sale module and a scan-only point of sale module. The full point of sale module can add items to a transaction and execute a payment phase of a transaction, and the scan-only point of sale module can add items to a transaction. A scan-only user interface can present information associated with the scan-only point of sale module while a transaction payment device presents a transaction total associated with the full point of sale module.

In some implementations, the full point of sale module or the scan-only point of sale module receive input indicating a status change of a transaction and the checkout system switches between the modules. For example, the scan-only point of sale module can receive input indicating that there is a transaction error and release transaction devices requested by the full point of sale module to clear the transaction error. In another example, the full point of sale module can determine that a customer is using an automated method (e.g., credit or debit card) to pay for goods/and or services associated with a transaction and initiate a switch to the scan-only point of sale module so that another transaction can be started.

In certain implementations, when a switch between modules is required, a first module that is currently in use can release control of all transaction devices required by a second module, or alternatively can release control of the transaction devices requested by the second module. A first user interface associated with the first module can be hidden or otherwise minimized from a display the first user interface was presented on and the second module can receive control of the necessary devices. A second user interface can be presented on the display, allowing a cashier or employee of a business to process a transaction using the second module.

In some implementations, when the checkout system switches between modules, information is passed between the modules, either directly or indirectly. For example, when a cashier is using a scan-only point of sale module and has completed adding products to a transaction, the checkout system can switch to the full point of sale module, with the scan-only point of sale module providing transaction information to the full point of sale module, so that the transaction can be completed.

The details of one or more implementations are set forth in the accompanying drawing and description below. Other features, objects, and advantages will be apparent from the description and drawings, and from the claims.

DESCRIPTION OF DRAWINGS

Like reference symbols in various drawing indicate like elements.

DETAILED DESCRIPTION OF ILLUSTRATIVE IMPLEMENTATIONS

A checkout or transaction system at a business is configured with two point of sale (POS) sessions or instances allowing an employee of the business to begin a second transaction while a customer pays for goods and/or services associated with a first transaction at the checkout system. For example, the checkout system allows the employee to begin scanning items placed on a conveyor or counter by a second customer while a first customer is providing payment for goods and/or services in the first transaction with a credit card, a debit card, or a gift certificate.

The checkout system executes two sessions of a point of sale application so that a first session manages the payment in the first transaction with the first customer while a second session manages the addition of items to the second transaction with the second customer. The two sessions share some of the same transaction devices of the checkout system and release control of certain transaction devices required by the other session when the checkout system switches between sessions. For example, the first point of sale session controls a receipt printer and a credit card reader while the first customer is providing payment in the first transaction and the second session controls a scanner, a display, and a keyboard while ringing up products for the second customer. In this example, when switching from the second session to the first session, the second session releases control of the scanner, the display, and the keyboard to the first session.

During the payment process, the first customer has physical access to the receipt printer and the card reader in order to complete the transaction. For example, both devices are configured to face the first customer during the payment process. Alternatively, the first customer has physical access to the card reader to complete the transaction, and once the transaction is complete, an employee presents the first customer with a receipt.

In some implementations, if the first customer encounters an error during the payment process, an error message is presented on the display. The error message indicates to the employee that the first customer needs assistance and allows the employee to switch between the second session currently presented on the display to the first session. The employee then assists the first customer with execution of the payment process, and either the employee or the customer removes the payment error.

In certain implementations, the use of two point of sale sessions reduces an employee's downtime during the payment process. In some implementations, the two point of sale sessions reduce the average wait time of customers during checkout.

Figure 1:
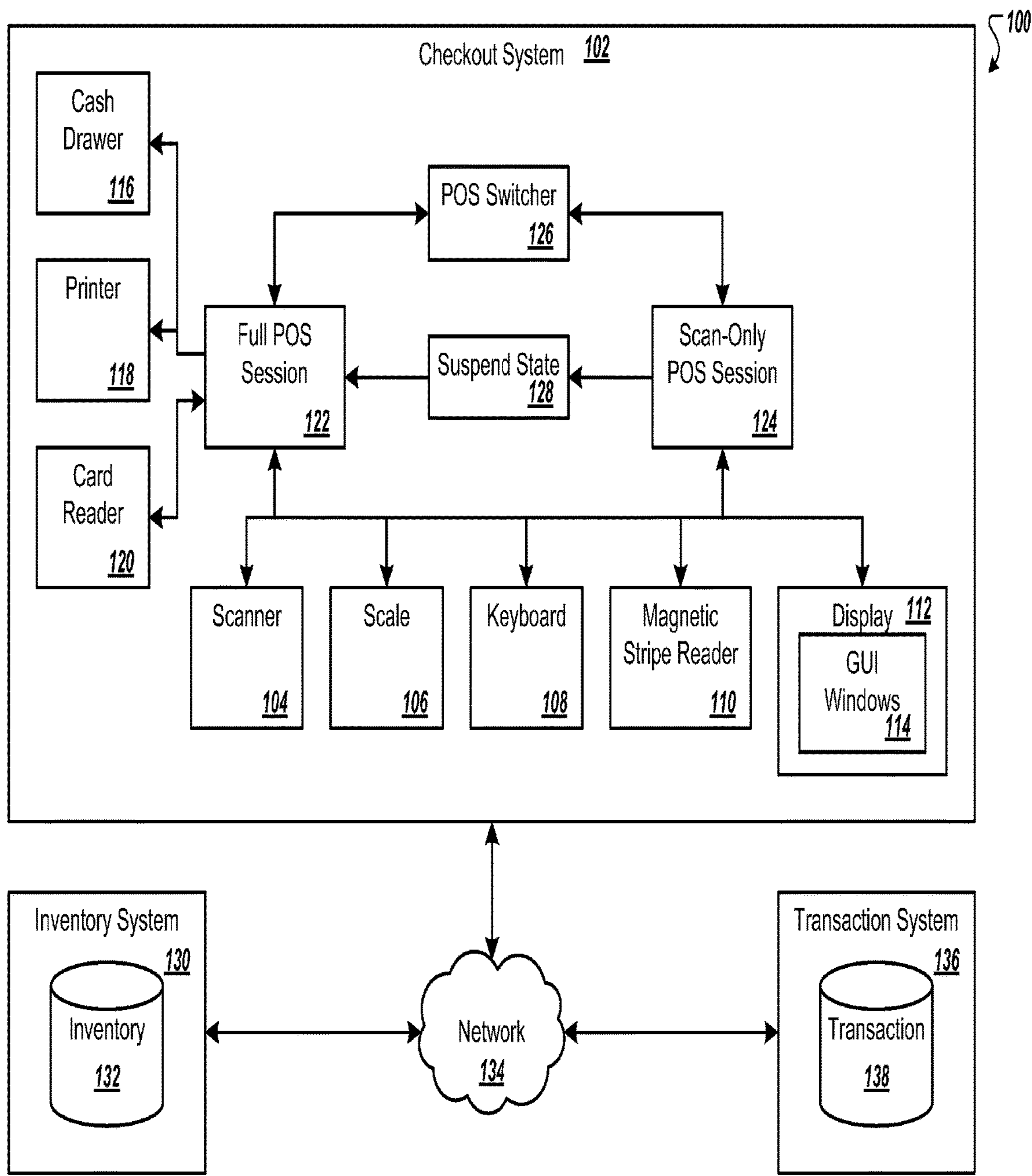
FIG. 1 illustrates an example of a retail environment for selling products from a retail store.

FIG. 1 illustrates an example of a retail environment 100 for selling products from a retail store. The retail environment 100 includes a checkout system 102 that adds products or items to a transaction and receives payment for goods and/or services in the transaction. The checkout system 102 includes one or more transaction devices, such as a scanner 104 for scanning in product codes, such as universal product codes or other bar codes, and a scale 106 for weighing products. As products are scanned or weighed, a corresponding product code and price are added to a transaction.

In some implementations, the checkout system 102 includes a radio frequency identification (RFID) reader (e.g., a transaction device) which adds products or items to transactions. For example, one or more products sold at the retail store include RFID tags that are detected by the RFID reader during the checkout process.

The checkout system 102 includes a keyboard 108 (e.g., a transaction device) for receiving input from an employee of the retail store. For example, the employee adjusts a quantity of a product added to the transaction with the keyboard 108 or enters product identification information for produce. In another example, an employee uses the keyboard 108 to adjust the price of a product if the product was incorrectly tagged or based on a coupon a customer presents.

A magnetic stripe reader 110 allows an employee of the retail store to use magnetic cards provided by a customer. For example, the employee swipes an employee purchase card in the magnetic stripe reader 110 to apply an employee discount if the customer is also an employee of the retail store. During execution of transactions by the employee, the magnetic stripe reader 110 is used to accept credit cards, debit cards, and/or gift certificates from customers.

Alternatively, a bar code reader (e.g., the scanner 104) or an RFID reader are optionally used to receive payment for one or more items associated with a particular transaction. For example, an employee uses the scanner 104 to apply a discount to a transaction or when accepting gift cards as a form of payment. In another example, the RFID reader detects payment information from a mobile telephone or a customer's credit card when receiving payment during a transaction.

In some implementations, the checkout system 102 receives payment from portable devices using wireless technology. For example, a media player or cellular telephone communicates with the checkout system 102 via a Bluetooth connection in order to provide the checkout system 102 with payment information.

A display 112 (e.g., a transaction device) in the checkout system 102 presents transaction information to the employee. For example, the display 112 presents the current total for the transaction and product information for one or more products recently added to a transaction. In some implementations, a customer is able to view transaction information that is presented on the display 112. In certain implementations, the display 112 is a touch screen monitor.

The checkout system 102 includes one or more transaction payment devices, such as a cash drawer 116, a printer 118, and a card reader 120. In some implementations, the transaction payment devices include a bar code reader, a wireless receiver, and/or an RFID reader. The transaction payment devices allow an employee to accept one or more different forms of payment, such as cash, check, or credit card, and provide a customer with a receipt. For example, the printer 118 prints a receipt for a customer after a transaction is completed.

The printer 118 and the card reader 120 and the other transaction payment devices are accessible by a customer during a transaction. For example, a customer has the option of providing a credit card to an employee of the retail store (e.g., for use in the magnetic stripe reader 110) or using the credit card in the card reader 120. After a transaction is completed, the customer can retrieve a receipt from the printer 118 without waiting for the employee to provide the receipt to them. In another example, the customer pays for goods and/or services during a transaction with a gift card using the bar code reader and/or with an RFID device using the RFID reader during the payment process.

In some implementations, a customer has access to some but not all of the transaction payment devices during a transaction. For example, the customer completes a payment phase of a transaction using the card reader 120 but does not have access to the printer 118. Once the transaction is completed, the printer 118 prints a receipt for the transaction and an employee of the retail store presents the receipt to the customer.

The checkout system 102 includes a full POS session 122 and a scan-only POS session 124. The full POS session 122 is used to add one or more products to transactions and receive payment during transactions and the scan-only POS session 124 is used to add one or more products to transactions without being able to receive payment during transactions. For example, the full POS session 122 allows a first customer to pay for goods and/or services associated with a first transaction while the scan-only POS session 124 allows an employee of the retail store to begin a second transaction with a second customer at the same time the first customer is providing payment for goods and/or services in the first transaction.

Both the full POS session 122 and the scan-only POS session 124 use the same compiled application code. For example, the executable associated with the full POS session 122 is named "POS.exe" and the executable associated with the scan-only POS session 124 is named "POSSCANONLY.exe" but the actual code used for each executable is the same. In certain implementations, using different names for the two executables allows the checkout system 102 to identify information associated with each of the session separately. In some implementations, using the same executable for the full POS session 122 and the scan-only POS session 124 reduces the amount of code to maintain.

In one example, the full POS session 122 and/or the scan-only POS session 124 are checkout instances or transaction processing instances. In some implementations, a full point of sale module performs the operations of the full POS session 122 and a scan-only point of sale module performs the operations of the scan-only POS session 124.

The executables for the full POS session 122 and the scan-only POS session 124 are located in different directories. Placement of the executables in different directories allows each of the executables to have separate configuration files. For example, the executable for the full POS session 122 is located in "C:\Program Files\Point of Sale\Directory 1" and the executable for the scan-only POS session 124 is located in "C:\Program Files\Point of Sale\Directory 2." Placing the executables in different folders allows each of the executables to have a configuration file with the same name (e.g., based on the same executable code) in the corresponding directory of the executable while the actual configuration of the files is different. For example, the configuration file for the scan-only POS session 124 indicates that the transaction payment devices are disabled (e.g., "Printer Disabled" and "Customer Payment Device Disabled"). Additionally, the use of different folders for each of the executables allows each executable to be associated with different log files, as discussed in more detail below.

In some implementations, the full POS session 122 and the scan-only POS session are initialized with different parameters. For example, using different parameters allows both executable files to be located in the same directory while having different configuration files (e.g., with different file names). In certain implementations, the different parameters are specified by command line arguments. In other implementations, different parameters are specified in the executable code and the different executable name determines the parameters (e.g., based on conditional statements).

The full POS session 122 and the scan-only POS session 124 are associated with different register numbers. For example, the register number of the scan-only POS session 124 is the register number of the full POS session 122 combined with a predetermined number. In one example, when the register number of the full POS session 122 is 0073, the register number of the scan-only POS session 124 is 1073. The different register numbers of the full POS session 122 and the scan-only POS session 124 are based on the names of the executable files. Alternatively, the register numbers are based on the configuration files associated with the respective session. In some implementations, the register numbers are determined based on the physical hardware (e.g., the hardware of the checkout system 102) running the POS sessions.

The full POS session 122 and the scan-only POS session 124 use different transaction number ranges. For example, different transaction number ranges are used to ensure that the full POS session 122 and the scan-only POS session 124 do not have a transaction with the same number at the same time or during the same day.

The full POS session 122 supports administrative options that are disabled in the scan-only POS session 124. For example, the full POS session 122 allows an employee to perform a "no sale" (e.g., to provide change to a customer or get cash out of a drawer) and the scan-only POS session 124 does not.

In certain implementations, the full POS session 122 allows an employee to scan some coupons or products that cannot be scanned while using the scan-only POS session 124. For example, when a customer is purchasing a cellular telephone and the employee is required to enter credit card information for a cellular contract, the cellular telephone can only be added to a transaction using the full POS session 122. Similarly, when a customer is applying for a credit card or a scanned item requires use of the card reader 120, an employee is required to use the full POS session 122. In some implementations, when a card reader is required, the scan-only POS session 124 allows an employee to use the magnetic stripe reader 110 to add an item to a transaction.

Products or services that require printing of chits or vouchers can only be entered using the full POS session 122. For example, when a customer requests a rain check for a product currently on sale, an employee will need to be using the full POS session 122 or switch to the full POS session 122 before the rain check is printed. Similarly, when an item that has been recalled is scanned, the scan-only POS session 124 will not print a recall slip for the item and the item will need to be scanned while using the full POS session 122 for a recall slip to be printed.

In some implementations, a POS switcher 126 included in the checkout system 102 controls which session's graphical user interface (GUI) window 114 is presented on the display 112. For example, the checkout system 102 includes a graphical user interface window associated with the full POS session 122 and another graphical user interface window associated with the scan-only POS session 124. The POS switcher 126 determines which of the two sessions is currently in use by an employee of the retail store and should be presented on the display.

When an employee of the retail store initially creates a first transaction for a first customer, the POS switcher 126 determines that another transaction is not currently in process in the checkout system 102 and the GUI window 114 associated with the full POS session 122 is presented on the display 112. When the first customer is providing payment for goods/and or services associated with the first transaction and another customer is at the checkout system 102, the POS switcher 126 switches to the scan-only POS session 124 and presents the associated GUI window 114 on the display 112. As described in more detail below, the scan-only GUI window allows the employee to add items to the second transaction without being able to accept payment for goods/ and or services associated with the second transaction.

When the first customer has finished providing payment in the first transaction, the POS switcher 126 transfers information associated with the second transaction to the full POS session 122 from the scan-only POS session 124 to allow the full POS session 122 to continue execution of the second transaction. For example, the POS switcher 126 stores a suspend state 128 of the scan-only POS session 124 on the checkout system 102 (e.g., in a local database). The suspend state 128 includes all information currently associated with the second transaction. The POS switcher 126 provides the full POS session 122 with a message indicating that the full POS session 122 should retrieve the suspend state 128 and present the GUI window 114 associated with the full POS session 122 on the display 112. The employee then uses the GUI window 114 associated with the full POS session 122 while adding the remaining products to the second transaction and receiving payment for goods and/or services associated with the transaction.

The full POS session 122 and the scan-only POS session 124 communicate using the GUI windows 114 associated with each application. For example, the full POS session 122 and the scan-only POS session 124 communicate directly by passing messages (e.g., PostMessages and/or SendMessages) using the GUI windows 114. In one example, when an employee logs into the full POS session 122, login synchronization between the full POS session 122 and the scan-only POS session 124 is performed by passing messages between the two sessions. The type of message used is determined based on the amount and/or type of data being sent. In certain implementations, using the GUI windows 114 to send and receive messages reduces the amount of time needed to transfer information between the two sessions.

In some implementations, when the checkout system 102 does not include the POS switcher 126, the full POS session 122 and the scan-only POS session 124 send messages to each other to determine which GUI window 114 should be presented on the display 112, to transfer transaction information, and/or synchronize device control. For example, when switching from the scan-only POS session 124 to the full POS session 122, the scan-only POS session 124 provides the full POS session 122 with a SendMessage notifying the full POS session 122 that transaction information is available. The full POS session 122 then receives the transaction information from the checkout system 102. For example, the transaction information is provided to the full POS session 122 via a register file based mechanism. In some implementations, providing the transaction information to the full POS session 122 using a register file based mechanism increases the speed of the information transfer.

During processing of transactions, the checkout system 102 communicates with an inventory system 130 to indicate which products have been sold. An inventory database 132 on the inventory system is updated with the corresponding product inventory. Additional products are ordered from one or more vendors (not shown) based on the current inventory of the retail store.

For example, a single retail store includes multiple checkout systems and a single inventory system. When a transaction is completed at any of the checkout systems, the inventory system 130 is updated accordingly. Additionally, a log associated with the full POS session 122 is optionally updated with transaction information at the end of each transaction.

The checkout system 102 communicates with the inventory system 130 over a network 134. The network 134 is a local area network in the retail store. In some implementations, when the inventory system 130 includes inventory information associated with multiple retail stores the network 134 is a wide area network, the Intranet, or an intranet. In certain implementations, the network 134 includes one or more wireless networks, such as an 802.11 network or a Bluetooth network.

In some implementations, when the scan-only POS session 124 is suspended, information associated with a transaction pending in the scan-only POS session 124 is stored on a transaction system 136 that is external to the checkout system 102. For example, the transaction system 136 includes a transaction database 138 that stores information for transactions that are currently in process at the retail store. When the full POS session 122 resumes the transaction, the full POS session 122 requests the transaction information from the transaction database 138 and completes the transaction.

The scan-only POS session 124 is not able to resume a transaction stored in the suspend state 128. For example, the full POS session 122 has access to the suspend state 128 and is able to resume processing of transactions stored in the suspend state 128.

The checkout system 102 includes one or more logs for the full POS session 122 and the scan-only POS session 124. For example, a first log file is created for the full POS session 122 and a second log file is created for the scan-only POS session 124. The log files are stored in the directory corresponding to the directory with the executable of the respective session. In this example, the log files include data collected throughout a transaction, such as items added to transactions and/or coupons applied to transactions. In one example, the first log file includes information collected during transaction processing with the full POS session 122 and the second log file includes information collected during transaction processing with the scan-only POS session 124. In another example, the full POS session 122 is associated with a log file that includes transaction information collected at the end of each transaction.

In some implementations, the checkout system 102 includes a single log file for both the full POS session 122 and the scan-only POS session 124. The single log file includes an identifier (e.g., register number or executable name) to identify the session associated with the entries in the single log file.

The logs associated with the full POS session 122 and the scan-only POS session 124 do not include any user identifiable information. For example, the logs do not include information provided by the user during the transaction, such as a name or an email address.

When the checkout system 102 processes returns, the checkout system 102 is required to use the full POS session 122. For example, when the display 112 is presenting the GUI window 114 associated with the scan-only POS session 124, an employee is required to switch to the GUI window 114 associated with the full POS session 122 before processing a return.

Figure 2A:
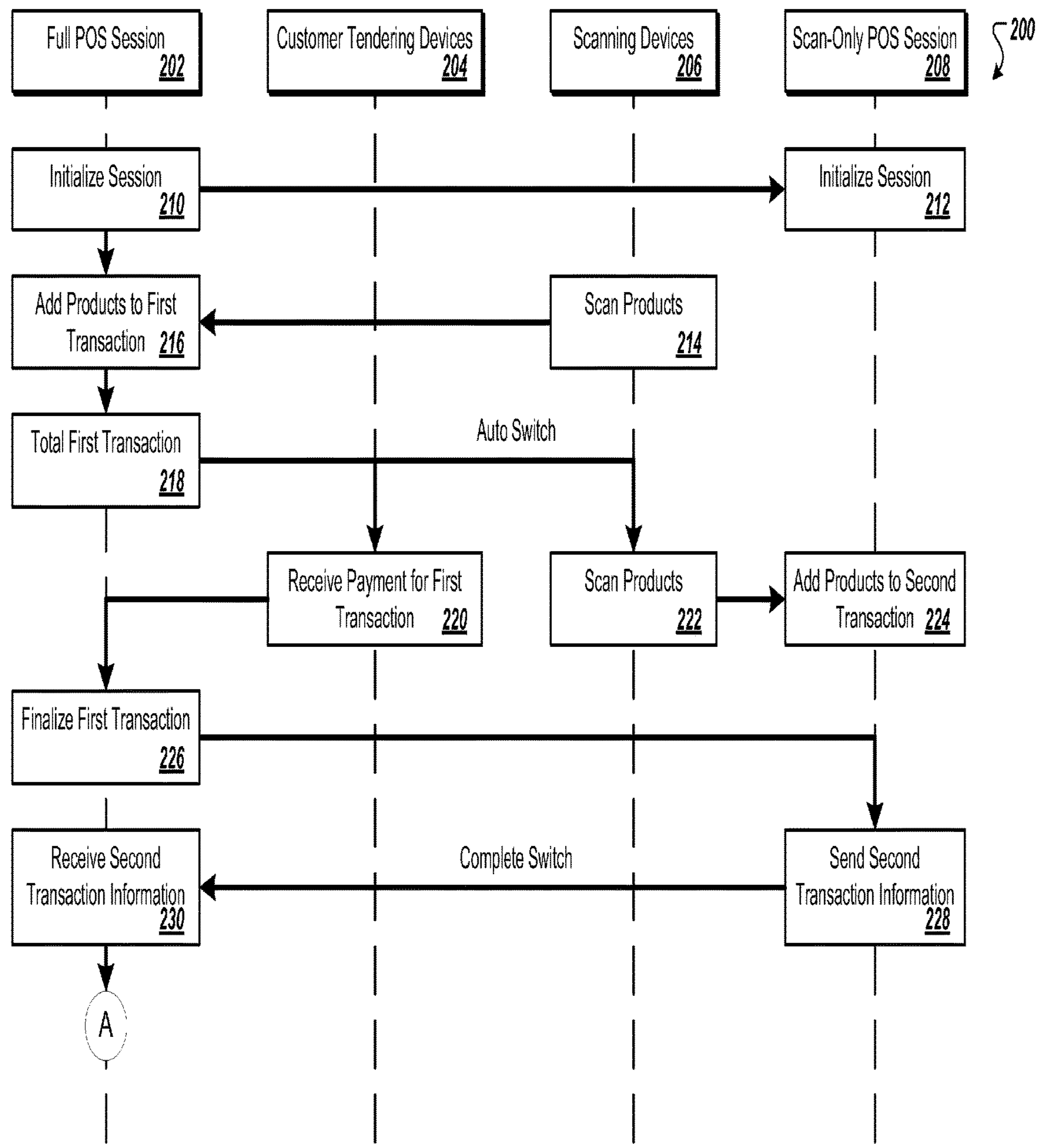
FIGS. 2A-B illustrate a swim lane diagram of an example procedure for execution of multiple transactions with multiple point of sale sessions.
Figure 2B:
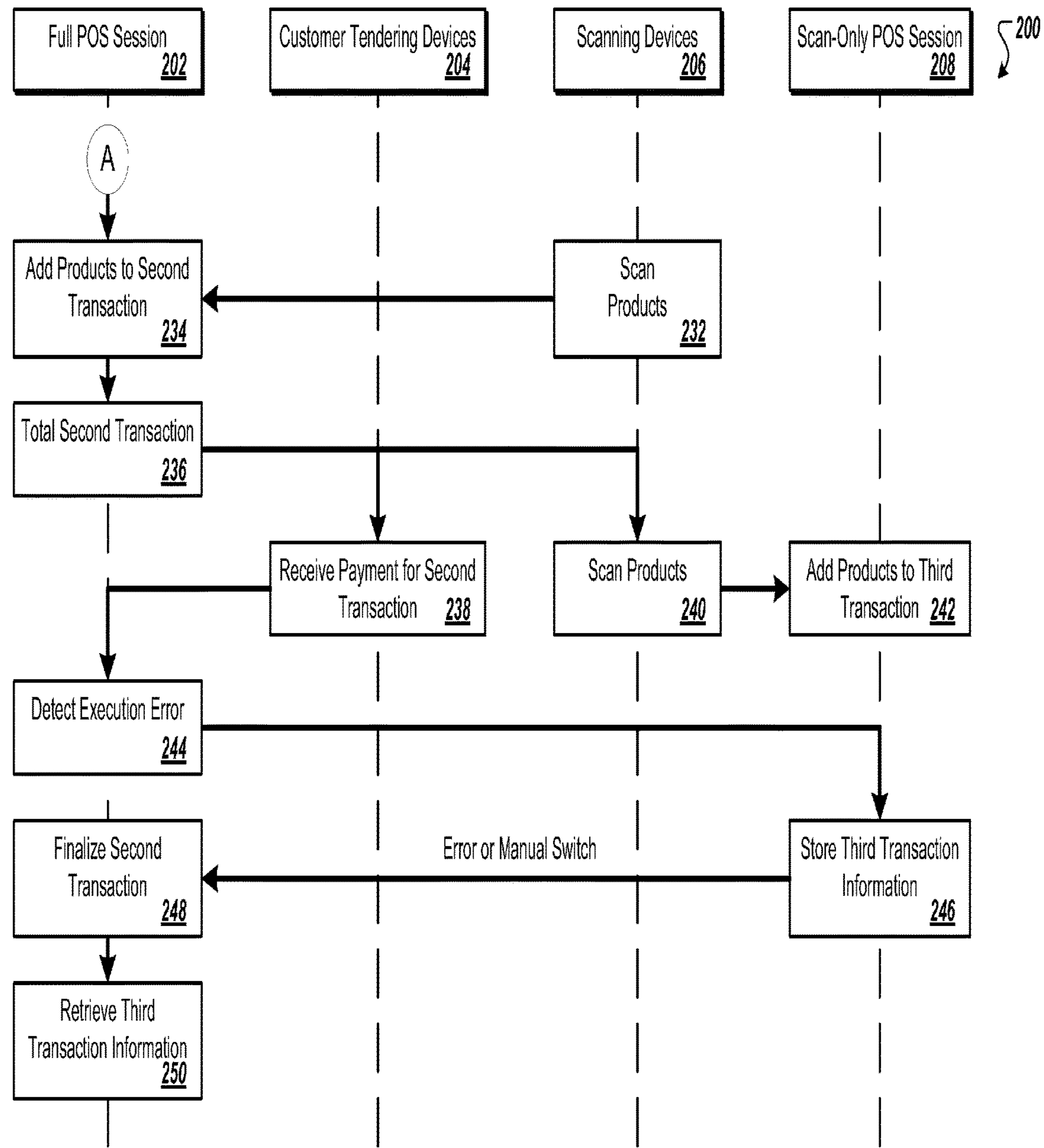

FIGS. 2A-B illustrate a swim lane diagram of an example procedure 200 for execution of multiple transactions with multiple point of sale sessions. The procedure is used in an environment, such as the retail environment 100, to process transactions at a checkout system. The checkout system includes a display for presenting a graphical user interface with transaction information.

A full POS session 202, located in a retail store, is used to add products to transactions and to accept payment for goods and/or services in transactions. The full POS session 202 communicates with one or more customer payment devices 204 when processing payment during a transaction.

The customer payment devices 204 include a cash drawer, a card reader, a bar code scanner, an RFID receiver, and/or a printer.

One or more scanning devices 206 provide the full POS session 202 with product information. For example, the one or more scanning devices 206 include scanners, scales, and/or radio frequency identification receivers.

A scan-only POS session 208 receives product information from the scanning devices 206 while a first customer is using the customer payment devices 204 to pay for goods and/or services in a particular transaction. In some implementations, the scan-only POS session 208 reduces customer wait time during a checkout process.

The full POS session 202 is initialized (210). For example, a checkout system is turned on and the full POS session 202 is initialized as part of the start up process. In some implementations, a GUI window associated with the full POS session 202 is presented on the display. In another example, the full POS session 202 is initialized when an employee selects an executable associated with the full POS session 202.

The scan-only POS session 208 is initialized (212). For example, the full POS session 202 determines if the scan-only POS session 208 is running, and initializes the scan-only POS session 208 if it is not running. In some implementations, the full POS session 202 and the scan-only POS session 208 are initialized at substantially the same time. For example, the checkout system receives a command from the employee to initialize the full POS session 202 and the scan-only POS session 208.

The scanning devices 206 scan one or more products (214). For example, an employee at a retail store removes one or more products from a conveyor and scans the products with a transceiver.

The full POS session 202 adds the one or more scanned products to a first transaction (216). For example, the full POS session 202 stores product information associated with the first transaction on the checkout system.

The full POS session 202 totals the first transaction (218). For example, the employee scanned all of the products associated with the first transaction and pressed a total button.

The customer payment devices 204 present information associated with the first transaction, and receive payment for goods and/or services in the first transaction (220) and the checkout system automatically switches between the full POS session 202 and the scan-only POS session 208. For example, a credit card reader displays a transaction total for the first transaction (e.g., in a user interface) and receives debit card information from a first customer to pay for items in the first transaction. The GUI window associated with the full POS session 202 is removed from the display (e.g., the display 112) and the display presents a GUI window associated with the scan-only POS session 208.

While the customer payment devices 204 receive payment for items in the first transaction, the scanning devices 206 scan one or more products (222) and the scan-only POS session 208 adds the one or more products to a second transaction (224). For example, the display presents a GUI window instructing the employee to scan products associated with a second customer while the first customer is providing payment for goods and/or services associated with the first transaction.

The full POS session 202 completes the first transaction (226). For example, a card reader accepts the debit card information and processes the charge. The full POS session 202 receives a message indicating that the form of payment was accepted and the first transaction is complete. A printer prints a receipt for the first transaction to allow the first customer to retrieve the receipt. Alternatively, an employee retrieves a receipt from the printer and provides the receipt to the first customer. In some implementations, the card reader validates the form of payment for approval of the first transaction. For example, the card reader verifies that the first customer has funds available to pay for items associated with the first transaction.

The scan-only POS session 208 receives an indication that the first transaction is complete and sends second transaction information to the full POS session 202 (228). For example, the full POS session 202 provides the scan-only POS session 208 with a message indicating that the first transaction completed, and the scan-only POS session 208 sends a message to the full POS session 202 with information associated with the second transaction. Alternatively, the scan-only POS session 208 stores information associated with the second transaction on the checkout system. The GUI window associated with the scan-only POS session 208 is removed from the display.

The full POS session 202 receives the second transaction information (230) and the checkout system presents the GUI window associated with the full POS session 202 on the display. For example, the full POS session 202 receives the second transaction information from the scan-only POS session 208. Alternatively, the full POS session 202 retrieves the second transaction information from the checkout system, e.g., a local database on the checkout system.

If there are additional products that remain to be scanned, the scanning devices 206 scan the remaining products (232) and the full POS session 202 adds the products to the second transaction (234).

The full POS session 202 totals the second transaction (236) and the customer payment devices 204 receive payment information in the second transaction (238). For example, the second customer selects to pay for the second transaction with a credit card.

While the second customer is providing payment in the second transaction, the scanning devices 206 scan one or more products (240) and the scan-only POS session 208 adds the one or more products to a third transaction (242).

Before the second customer has completed payment for items associated with the second transaction, the full POS session 202 detects an execution error (244). For example, the full POS session 202 determines that the second customer's credit card was declined, and provides an error message to the scan-only POS session 208. In another example, the full POS session 202 identifies an error if the current duration of a payment phase of the execution process is greater than a threshold duration. For example, if the second customer has spent more than two minutes on the payment process, the full POS session 202 determines that the second customer may need assistance and the employee should be notified. Alternatively, the full POS session 202 identifies a different execution error, such as a disconnection between a card reader and the checkout system.

The scan-only POS session 208 presents the error message in the GUI window associated with the scan-only POS session 208 and the employee is unable to scan additional products until the employee has acknowledged the error message and assisted the second customer.

After the employee acknowledges the error message, the scan-only POS session 208 stores third transaction information and the GUI window associated with the scan-only POS session is removed from the display (246). For example, the scan-only POS session 208 stores the third transaction information in a local database on the checkout system.

The GUI window associated with the full POS session 202 is presented on the display and the full POS session 202 completes the second transaction (248). For example, the second customer provides the employee with an alternate form of payment. Alternatively, the full POS session 202 or the GUI window associated with the full POS session 202 receives payment information from the customer and the second transaction is completed.

The full POS session 202 retrieves the third transaction information (250) and continues execution of the third transaction. For example, the full POS session 202 retrieves the third transaction information from the local database and one or more additional products are added to the third transaction before receiving payment for items in the third transaction.

In some implementations, an employee performs a manual switch between the scan-only POS session 208 and the full POS session 202. For example, when an employee presses the total button for a first transaction associated with a first customer, the GUI window associated with the full POS session 202 is removed from the display and the GUI window associated with the scan-only POS session 208 is presented.

If the first customer identifies coupons applicable to the first transaction, the first customer presents the coupons to the employee and the employee performs a manual switch back to the full POS session 202. Second transaction information associated with any products scanned for a second customer is saved locally to the checkout system and the GUI window associated with the full POS session 202 is presented on the display. The employee applies the coupons to the first transaction and receives payment for goods and/or services associated with the first transaction. Once the first transaction is completed, the full POS session 202 retrieves the second transaction information and resumes the second transaction.

In some implementations, an employee is allowed to perform a manual switch from the full POS session 202 to the scan-only POS session 208. For example, when there is only one customer in line and an employee is helping that customer with the payment process (e.g., after pressing a total button) and another customer moves into line, the employee can perform a manual switch to the scan-only POS session 208 and begin a new transaction for the new customer.

Figure 3:
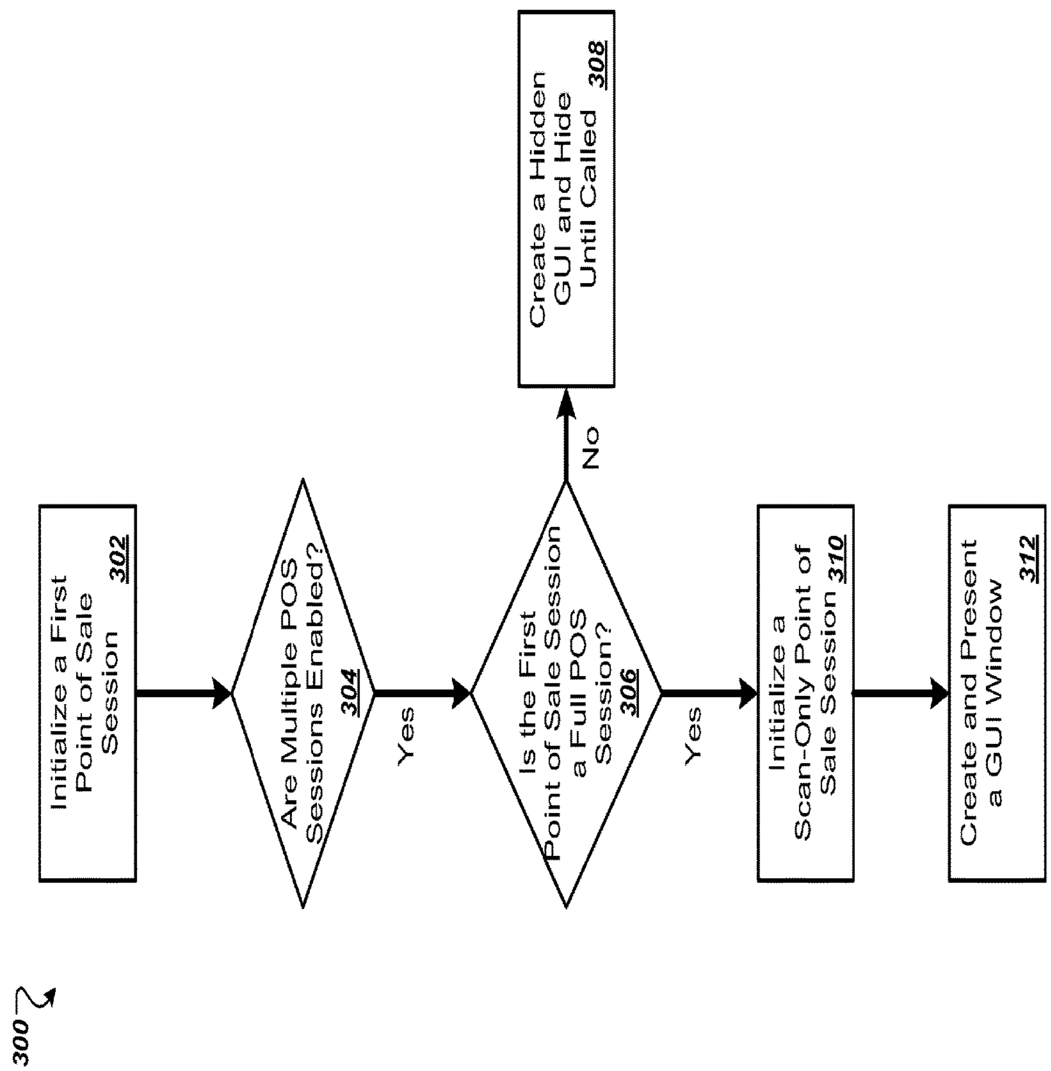
FIG. 3 illustrates a flow chart of an example process for initializing a point of sale session.

FIG. 3 illustrates a flow chart of an example process 300 for initializing a point of sale session. The retail environment 100 and parts thereof will be referred to in the following as examples. In other implementations, the process 300 is performed by other environments or systems in conjunction with or instead of the retail environment 100.

The process 300 is used by the full POS session 122 and the scan-only POS session 124 upon initialization because both sessions have the same executable code. In other implementations, initialization of the full POS session 122 and/or the scan-only POS session 124 requires alternate steps and/or a different number of steps than the process 300.

A checkout system initializes (302) a first point of sale session. For example, the checkout system 102 initializes the full POS session 122 when the checkout system 102 is turned on. Alternatively, the first point of sale session is initialized when the checkout system receives input indicating a user selection of an executable (e.g., "POS.exe").

The first point of sale session determines (304) if multiple POS sessions are enabled. For example, the full POS session 122 determines if the checkout system 102 should use a single point of sale session or if the checkout system 102 should run multiple point of sale sessions.

If the first point of sale session determines that multiple POS session are not enabled, the process 300 ends. For example, the full POS session 122 determines that the checkout system 102 is in training mode and multiple POS sessions are not needed. Alternatively, in some training modes the checkout system 102 uses multiple POS sessions. In another example, the full POS session 122 determines that the checkout system 102 is primarily used for returns and multiple POS sessions are not required.

In certain implementations, when only one POS session is running on the checkout system 102, an employee is able to initialize a second POS session with user input (e.g., selection of a button or executable associated with the second POS session). Alternatively, a second POS session is enabled or disabled on a checkout system based on a parameter in a server database associated with the checkout system and/or a retail store that includes the checkout system. For example, when the checkout system is initially turned on, the checkout system identifies the value of the parameter in the server database to determine if a second POS session (e.g., the scan-only POS session 124) should be initialized on the checkout system.

If the first point of sale session determines that multiple POS sessions are enabled, the first point of sale session determines (306) whether the first point of sale session is a full POS session. For example, the first point of sale session identifies the name of the executable associated with the first point of sale session or a parameter from the associated configuration file.

If the first point of sale session determines that the first point of sale session is not a full POS session, the first point of sale session creates (308) a hidden GUI window and hides until called. For example, the first point of sale session determines that the first point of sale session is a scan-only POS session and the display 112 should not currently present the GUI window associated with the first point of sale session. The first point of sale session creates the GUI window 114 associated with the first point of sale session to enable communication with a full POS session and remains hidden until called upon by the full POS session 122.

If the first point of sale session is a full POS session, the first point of sale session initializes (310) a scan-only point of sale session, and creates and presents (312) a GUI window. For example, the first point of sale session initializes the scan-only POS session 124 and creates the GUI window 114 associated with the first point of sale session to enable communication with the scan-only POS session 124. The first point of sale session presents the GUI window on the display 112.

Figure 4:
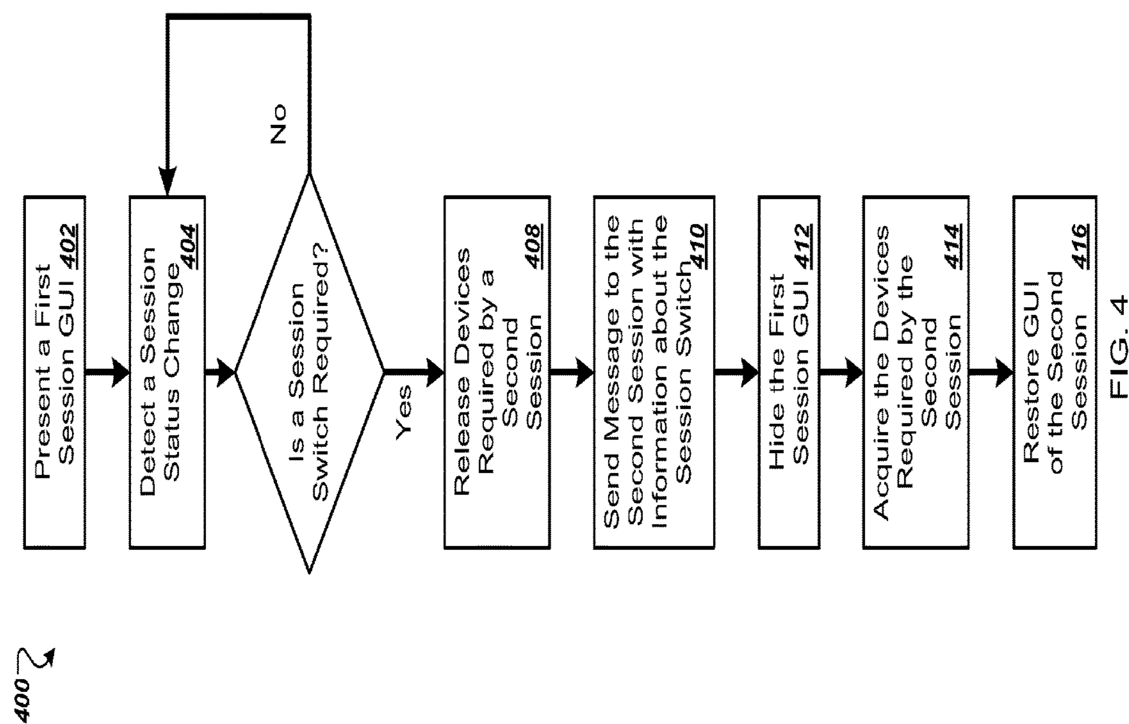
FIG. 4 illustrates a flow chart of an example process for switching between point of sale sessions.

FIG. 4 illustrates a flow chart of an example process 400 for switching between point of sale sessions. The retail environment 100 and parts thereof will be referred to in the following as examples. In other implementations, the process 400 is performed by other environments or systems in conjunction with or instead of the retail environment 100.

A display presents (402) a first session GUI window associated with a first session. For example, the display 112 presents the GUI window 114 associated with the full POS session 122.

The first session detects (404) a session status change. For example, the first session detects a status change in the current process of the first session (e.g., scan versus receive payment for goods/and or services associated with a transaction), that an employee would like to perform a "no sale," or that the employee pressed a specific button on the keyboard 108.

Alternatively, the first session detects a status change of a second session that is currently running in the background on the checkout system 102. For example, the scan-only POS session 124 determines that the GUI window associated with the full POS session 122 should be presented on the display 112. In one example, a customer needs assistance making a payment in a transaction and the session change is required so the employee can help the customer. In another example, a customer completed a transaction (i.e., completed a payment in a transaction) and a transaction currently being processed by the first session (e.g., the scan-only POS session 124) will be completed in the second session (e.g., the full POS session 122).

The first session determines (406) whether the session status change indicates a session switch is required. For example, the first session determines if a status condition is met and the display 112 should present a GUI window associated with the second session. If the first session determines that a status condition has not been met, the process 400 proceeds with step 404. For example, when the first session detects selection of a key (e.g., other than a session switch key), the process 400 proceeds with step 404.

In one example, as described above, when the full POS session 122 determines that an employee of the retail store requested a manual switch to the scan-only POS session 124 (e.g., with selection of a session switch button), the full POS session 122 determines that the display should present the GUI window 114 associated with the scan-only POS session 124. Alternatively, as described above, selection of a manual switch button allows an employee to switch from the scan-only POS session 124 to the full POS session 122.

In another example, an auto switch occurs when the full POS session 122 determines that a customer is making a payment with an eligible form of payment (e.g., credit card, debit card, or gift certificate). In this example, an auto switch only occurs after the employee has pressed the total button for a specific transaction and the full POS session 122 determines that the customer should be able to complete the payment process in the transaction without assistance. In another example, an auto switch optionally occurs when the checkout system 102 determines that another customer is in line. For example, a customer detection system monitors the checkout system 102 and uses object recognition to determine if another customer is in the line of the checkout system. The customer detection system can then provide the checkout system 102 with an indication that the checkout system 102 should switch to the scan-only POS session 124 when another customer is in the line. An auto switch causes the removal of the GUI window 114 associated with the full POS session 122 from the display and presentation of the GUI window 114 associated with the scan-only POS session 124.

In some implementations, when the full POS session 122 determines that a transaction has been completed, the full POS session 122 provides the scan-only POS session 124 with a message indicating that the scan-only POS session 124 should provide the full POS session 122 with information associated with the current transaction processed by the scan-only POS session 124. The checkout system 102 will then remove the GUI window 114 associated with the scan-only POS session 124 from the display 112 and present the GUI window 114 associated with the full POS session 122.

In certain implementations, a transaction completed switch does not occur until an employee provides input to a transaction completed message. For example, the scan-only POS session 124 will stop accepting additional product information and the GUI window 114 associated with the scan-only POS session 124 will present the transaction completed message. After the employee acknowledges the transaction completed message (e.g., by selecting enter), the checkout system 102 presents the GUI window 114 associated with the full POS session 122 on the display and the employee continues to process the transaction. In other implementations, the checkout system 102 switches to the GUI window 114 associated with the full POS session 122 on the fly without presenting a message to the employee.

In some implementations, a transaction completed switch from the scan-only POS session 124 to the full POS session 122 automatically occurs after the full POS session 122 provides the scan-only POS session 124 with a transaction completed message and the scan-only POS session 124 determines that a predetermined status change has occurred. For example, after the scan-only POS session 124 receives the transaction completed message, if the scan-only POS session 124 determines that the employee pressed a total button, then a transaction completed switch occurs from the scan-only POS session 124 to the full POS session 122.

An error switch occurs when a customer is having a problem making a payment in a transaction and the GUI window 114 associated with the scan-only POS session 124 is presented on the display 112. The full POS session 122 detects that there is a problem (e.g., based on the total time of a payment phase of the transaction or a declined form of payment) and provides the scan-only POS session 124 with an error message. The display 112 presents the error message in the GUI window 114 associated with the scan-only POS session 124 and waits for the employee to acknowledge the error message. After the error message is acknowledged, the display presents the GUI window 114 associated with the full POS session 122 and the employee assists the customer with the payment phase of the transaction. For example, the employee or the customer enters another form of payment to complete the transaction.

Continuing with the process 400, if the session status change indicates a session switch is required, the first session releases (408) one or more devices required by a second session. For example, when switching from the full POS session 122 to the scan-only POS session 124, the full POS session 122 releases control of the scanner 104, the scale 106, the keyboard 108, the magnetic stripe reader 110, and the display 112. Similarly, when switching from the scan-only POS session 124 to the full POS session 122, the scan-only POS session 124 releases control of the scanner 104, the scale 106, the keyboard 108, the magnetic stripe reader 110, and the display 112.

The first session sends (410) a message to the second session including information about the session switch. For example, the full POS session 122 sends an error message to the scan-only POS session 124 and the GUI window 114 associated with the scan-only POS session 124 presents a message based on the error to the employee.

The first session hides (412) the first session GUI window. For example, the full POS session 122 removes (e.g., minimizes) the associated GUI window 114 from the display 112. Alternatively, when switching from the scan-only POS session 124, the GUI window 114 associated with the scan-only POS session 124 is removed from the display 112.

The second session acquires (414) the devices required by the second session. For example, the scan-only POS session 124 acquires control of the scanner 104, the scale 106, the keyboard 108, the magnetic stripe reader 110, and the display 112. Alternatively, the full POS session 122 acquires control of the scanner 104, the scale 106, the keyboard 108, the magnetic stripe reader 110, and the display 112 when switching from the scan-only POS session 124.

The second session restores (416) the GUI window of the second session. For example, the second session presents the GUI window 114 associated with the second session on the display 112.

In some implementations, one or more of the steps in the process 400 are performed in a different order. For example, the second session acquires the devices requested by the second session and then the first session hides the first session GUI window.

In certain implementations, one or more of the steps in the process 400 are performed by another component in the retail environment 100. For example, the second session hides the first session GUI window on the display 112.

Figure 5A:
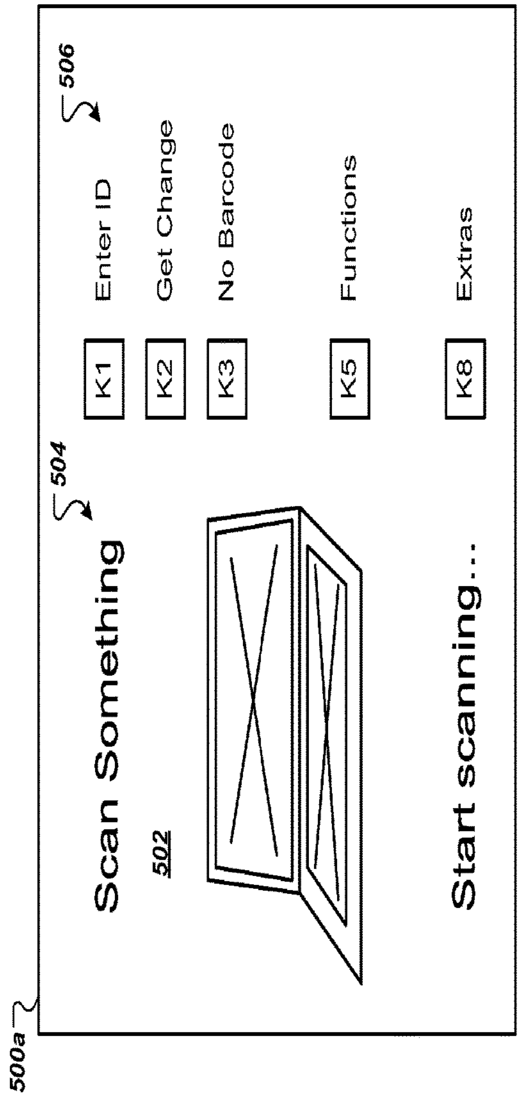
FIGS. 5A-B illustrate examples of point of sale user interface windows.
Figure 5B:
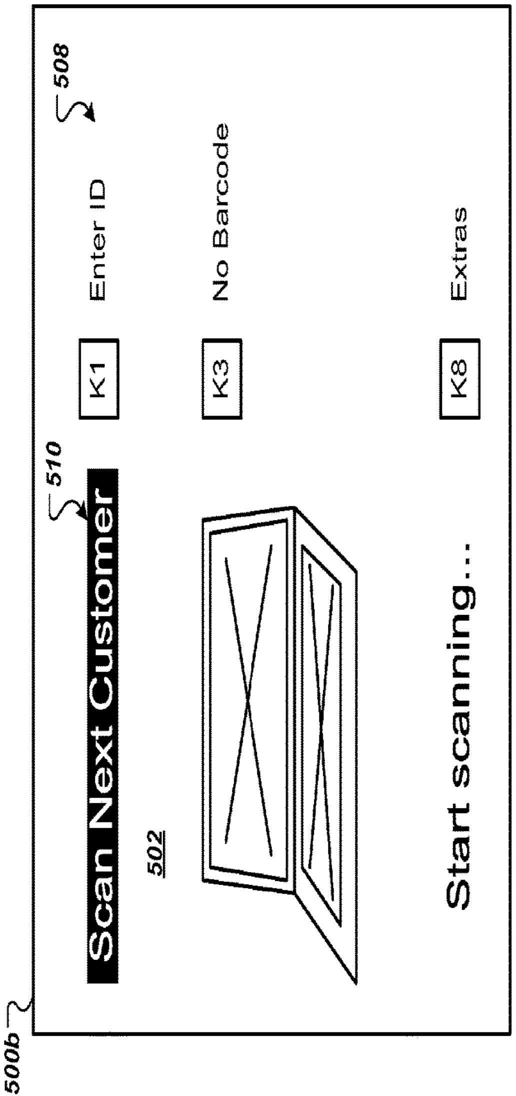

FIGS. 5A-B illustrate examples of point of sale user interface windows 500*a-b*. The user interface window 500*a* is associated with the full POS session 122 described above. The user interface window 500*a* presents information to an employee of a retail store indicating the steps the employee should perform during a transaction and the options available to the employee.

The user interface window 500*a* includes a product identifier field 502. The product identifier field 502 presents information about a product most recently scanned, e.g., using the scanner 104. For example, the product identifier field presents the universal product code (UPC) of the most recently scanned product.

The user interface window 500*a* includes one or more instructions 504 for the current actions available to the employee. For example, the instructions 504 indicate that the employee should begin scanning products in order to start a transaction.

The user interface window 500*a* includes one or more options 506. For example, each of the options 506 corresponds to a key on the keyboard 108 and an action available to the employee. In another example, the display 112 is a touch screen display and the employee is able to select the options by touching a corresponding portion of the display 112.

The options 506 allow the employee to perform advanced actions that the employee would not be able to perform while using a user interface associated with the scan-only POS session 124 (e.g., the user interface window 500*b*). For example, the user interface window 500*a* allows the employee to get change for a customer.

The user interface window 500*b*, as shown in FIG. 5B, is associated with the scan-only POS session 124 and provides the employee with options associated with the devices controlled by the scan-only POS session 124. For example, since the scan-only POS session 124 cannot control the cash drawer 116, one or more options 508 presented in the user interface window 500*b* do not include the ability to get change for a customer.

The user interface window 500*b* includes a black background on one or more areas of the user interface window 500*b* that distinguish the user interface window 500*b* from the user interface window 500*a*. For example, one or more instructions 510 presented in the user interface window 500*b* include different text (e.g., "scan next customer") and a black background that differentiate the instructions 510 from the instructions 504 (e.g., "scan something") with a white background.

In some implementations, the black background helps an employee to determine which point of sale session is being used (e.g., the full POS session 122 versus the scan-only POS session 124) and what options are available to the employee. In certain implementations, a differentiation in the user interface helps an employee determine what action to take (e.g., help a current customer make a payment in a transaction versus scan a next customer's products).

Figure 6:
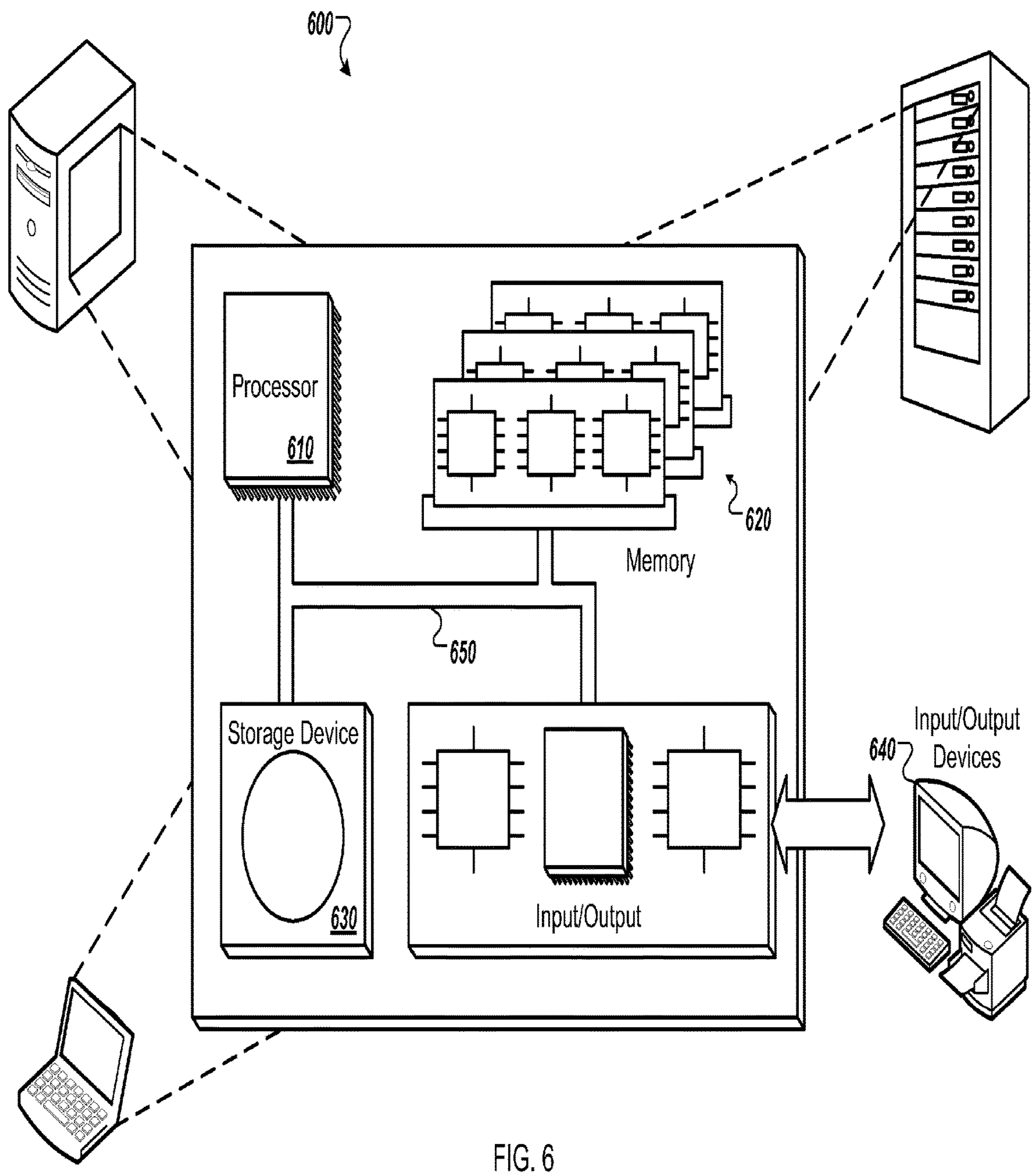
FIG. 6 is a block diagram of a computing system optionally used in connection with computer-implemented methods described in this document.

FIG. 6 is a schematic diagram of a generic computer system 600. The system 600 is optionally used for the operations described in association with any of the computer-implemented methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 is optionally a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

In some examples, the features described are implemented in digital electronic circuitry, or in computer hardware, firmware, software, or in combinations of them. The apparatus is optionally implemented in a computer program product tangibly embodied in an information carrier, e.g., in a machine-readable storage device or in a propagated signal, for execution by a programmable processor; and method steps are performed by a programmable processor executing a program of instructions to perform functions of the described implementations by operating on input data and generating output. The described features are optionally implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that are optionally used, directly or indirectly, in a computer to perform a certain activity or bring about a certain result. A computer program is optionally written in any form of programming language, including compiled or interpreted languages, and it is deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory are optionally supplemented by, or incorporated in, ASICs (application-specific integrated circuits).

To provide for interaction with a user, the features in some instances are implemented on a computer having a display device such as a CRT (cathode ray tube) or LCD (liquid crystal display) monitor for displaying information to the user and a keyboard and a pointing device such as a mouse or a trackball by which the user provides input to the computer.

The features are optionally implemented in a computer system that includes a back-end component, such as a data server, or that includes a middleware component, such as an application server or an Internet server, or that includes a front-end component, such as a client computer having a graphical user interface or an Internet browser, or any combination of them. The components of the system are connected by any form or medium of digital data communication such as a communication network. Examples of communication networks include, e.g., a LAN, a WAN, and the computers and networks forming the Internet.

The computer system optionally includes clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications are optionally made without departing from the spirit and scope of this disclosure. Accordingly, other embodiments are within the scope of the following claims.

What is claimed is:

1. A system comprising:

a computer-implemented full checkout module configured to perform a full POS session using a transaction system to execute a first transaction, the full POS session being a first application;

a computer-implemented scan-only checkout module configured to perform a scan-only POS session using the transaction system to add one or more products to a second transaction at substantially the same time that the computer-implemented full checkout module executes the first transaction, the scan-only POS session being a second application, the second application differing in at least one respect from the first application;

a checkout display being configured to present a scan-only graphical user interface while the computer-implemented scan-only checkout module adds the products to the second transaction, wherein the scan-only graphical user interface is associated with the computer-implemented scan-only checkout module and presents information associated with the products added to the second transaction, said checkout display being further configured to replace said scan-only graphical user interface displayed on an interactive screen of said checkout display with a full graphical user interface displayed on said interactive screen while the computer-implemented full checkout module is being used to consummate the second transaction, wherein the scan-only graphical user interface cannot consummate the second transaction; and a transaction device configured to receive payment during the first transaction while the computer-implemented full checkout module executes the first transaction.

2. The system of claim 1, further comprising a printer configured to print a receipt for the first transaction after the transaction device receives payment during the first transaction.

3. The system of claim 1, wherein the at least one respect includes the ability of the full POS session to use the transaction device to receive payment for the first transaction and the inability of the scan-only POS session to use the transaction device to receive payment for the second transaction.

4. The system of claim 1, wherein the at least one respect includes the ability of the full POS session to use the printer to print a receipt for the first transaction and the inability of the scan-only POS session to use the printer to print a receipt for the second transaction.

5. The system of claim 1, wherein the at least one respect includes an executable name for the first application which is different from an executable name for the second application.

6. The system of claim 1, wherein the at least one respect includes a configuration file for the first application which is different from a configuration file for the second application.

7. The system of claim 1, wherein the scan-only graphical user interface includes a message identifying a current state of the first transaction.

8. A system comprising:

a computer-implemented full checkout module configured to execute a first transaction;

a computer-implemented scan-only checkout module configured to add one or more products to a second transaction at substantially the same time that the computer-implemented full checkout module executes the first transaction;

a checkout display configured to present a scan-only graphical user interface while the computer-implemented scan-only checkout module adds the products to the second transaction, wherein the scan-only graphical user interface is associated with the computer-implemented scan-only checkout module, the scan-only graphical user interface identifies a current state of the first transaction and presents information associated with the products added to the second transaction; and a transaction device configured to receive payment during the first transaction while the computer-implemented full checkout module executes the first transaction.

9. The system of claim 8, wherein the checkout display is configured to present a full graphical user interface corresponding to a full POS session during the second transaction when a predetermined condition is present.

10. The system of claim 9, wherein the predetermined condition is an error in the first transaction.

11. The system of claim 10, wherein the error is a payment error.

12. The system of claim 8, wherein the checkout display is configured to present, in place of the scan-only graphical user interface, a full graphical user interface corresponding to a full POS session when the first transaction is completed so that the full POS session can complete processing of the second transaction.

13. A system comprising:

a checkout including a computer-implemented full checkout module, a computer-implemented scan-only checkout module, a checkout display and a payment transaction device;

said computer-implemented full checkout module being configured to execute a first transaction;

said computer-implemented scan-only checkout module being configured to add one or more products to a second transaction at substantially the same time that the computer-implemented full checkout module executes the first transaction;

said checkout display being configured to present a scan-only graphical user interface while the computer-implemented scan-only checkout module adds the products to the second transaction, wherein the scan-only graphical user interface is associated with the computer-implemented scan-only checkout module, the scan-only graphical user interface identifies a current state of the first transaction and presents information associated with the products added to the second transaction;

said payment transaction device being configured to receive payment during the first transaction while the computer-implemented full checkout module executes the first transaction; and, said checkout being configured to toggle between said computer-implemented full checkout module and said computer-implemented scan-only checkout module.

14. The system, as set forth in claim 13, wherein said checkout is configured to detect a first status change and determine that the first status change is indicative of a session switch from said computer-implemented full checkout module to said computer-implemented scan-only checkout module, and said checkout being configured to detect a second status change and said checkout further being configured to determine that the second status change is indicative of a session switch from said computer-implemented scan-only checkout module to said computer-implemented full checkout module.

15. The system, as set forth in claim 14, wherein said checkout is configured to release a first scanner used by said computer-implemented full checkout module to scan one or more products for the first transaction and allow said computer-implemented scan-only checkout module to acquire said first scanner to scan one or more products of the second transaction.

16. The system, as set forth in claim 14, wherein said checkout is configured such that upon a session switch from said computer-implemented full checkout module to said computer-implemented scan-only checkout module, the scan-only graphical user interface is displayed on the checkout display prior to consummation of the first transaction.

17. The system, as set forth in claim 16, wherein the first status change indicates that said computer-implemented full checkout module is currently receiving payment in the first transaction and that said computer-implemented scan-only checkout module should begin a second transaction.

18. The system, as set forth in claim 13, wherein said payment transaction device is configured to receive payment for the second transaction when the computer-implemented full checkout module is processing the second transaction.

19. A system comprising:

a checkout including a computer-implemented full checkout module, a computer-implemented scan-only checkout module, a checkout display and a payment transaction device;

said computer-implemented full checkout module being configured to execute a first transaction;

said computer-implemented scan-only checkout module being configured to add one or more products to a second transaction at substantially the same time that the computer-implemented full checkout module executes the first transaction;

said checkout display being configured to present a scan-only graphical user interface while the computer-implemented scan-only checkout module adds the products to the second transaction, wherein the scan-only graphical user interface is associated with the computer-implemented scan-only checkout module, the scan-only graphical user interface identifies a current state of the first transaction and presents information associated with the products added to the second transaction;

said payment transaction device being configured to receive payment during the first transaction while the computer-implemented full checkout module executes the first transaction; and, wherein said checkout is configured to release a first scanner used by said computer-implemented full checkout module to scan one or more products for the first transaction and allow said computer-implemented scan-only checkout module to acquire said first scanner to scan one or more products of the second transaction.

* * * * *